Patented Sept. 14, 1943

2,329,509

UNITED STATES PATENT OFFICE 2,329,509

PROCESS FOR FERMENTED CEREAL BEVERAGES

Harry G. Atwood, Peoria, Ill.

No Drawing. Application December 6, 1940, Serial No. 368,853

4 Claims. (Cl. 99—42)

This invention relates to a process for producing a cereal wort or fermented beverage which is enzymically active, from a raw cereal such as corn, with only a small amount of malted grain, the proportions being approximately 80% of raw cereal and 20% of malted grain. The process permits rapid and economical filtration to provide a low cost cereal extract which may be concentrated to a syrup or fermented with yeast in a closed system for a short period of time without filtration, then aseptically filtered and packaged without pasteurizing to produce an enzymically active, biologically-stable, chill-proof beverage containing traces of carbohydrates and substantial amounts of soluble nitrogenous bodies.

The conventional process for obtaining extract from cereals such as employed in the brewing industry produces a non-enzymically active wort or beer from cereals of which 65% is malted grain and the balance raw or cooked cereals or syrups processed by temperature control during conversion to produce a large amount of unfermentable carbohydrates such as dextrins to act as body materials and to produce foam holding properties. The high proportion of malted grains used was dictated by the necessity of providing material to build up a thick filter bed to properly filter this mixture, and because the raw grains produced colloidal viscoid properties which made effective, economical filtering practically impossible.

The particular object of this invention is to provide a process for producing a bacteria-free cereal extract from a large proportion of raw cereal and a low proportion of malted cereal which can be rapidly, effectively and economically filtered to produce a low cost enzymically active sterile wort which, when fermented with pure culture yeast for a short period of time without refrigeration, will contain only traces of carbohydrates and large amounts of soluble products which, after aseptic filtration will result in a biologically stable, clear, brilliant, chill-proof cereal beverage requiring no pasteurization.

A further object is to provide a continuous bacteria-free process for producing a low cost enzymically active, sterile wort having the maximum yield of fermentable sugars and grain solubles which, when fermented produce a superior quality of cereal beverage having non-coagulable, permanently soluble albumoses and peptones which give the beverage pronounced grain and hop bouquet.

Other objects and benefits will be disclosed in the following descriptions in which I propose to make a clear and precise disclosure of my invention.

Heretofore the conventional brewing procedure was mainly concerned with producing a non-enzymically active wort or beer from at least 65% or more of malt, the balance raw or cooked cereals and syrups in an attempt to produce by temperature control during conversion a large amount of unfermentable carbohydrates such as dextrins to act as a body material, and to lend foam holding properties which in reality were only partially accomplished and actually resulted in a satiating sweetness in the finished product detracting from its consumption. Furthermore, the conventional brewing procedures did not teach the necessary action of the enzymes as catalysts in the hydrolysis of complex compounds to simpler products which are soluble and bear an important relationship to the filtration of the mash.

The object of my process is to teach and disclose an entirely new concept of conversion and a continuous bacterial free fermentation which permits the use of a minimum amount (20%) of high Lintner malt, the balance being comprised of a cheap source of starch converted into theoretical yields of extracts and effecting a rapid economical separation of the same by any conventional filter. In the past excess amounts of malt were necessary for the purpose of supplying a filter bed for the separation of the extract and in contradistinction I teach that a low cost source of starch such as corn grits without regard to its fibrous content or ability to build up a filter bed can be used in excess amounts with a minimum amount of malt also free of fibrous material to produce a rapidly economically filterable extract. I teach that a cereal beverage made from grains relatively free of their fiber content produces a far superior quality in the finished product than that produced from the same materials and their own fiber content. According to my process I make no attempt to produce unfermentable carbohydrates such as dextrins, destroy or restrict the action of enzymes, or to refrigerate over lengthy fermentation or storage periods. I do teach that as much fermentable sugars be produced and fermented, and as much solubles produced as possible. All of these factors result in an enzymically active sterile wort at low cost which when fermented with pure culture yeast for a short period of time without refrigeration will contain only traces of carbohydrates, large amounts of soluble products, and which will be biologically stable and chill proof after aseptic filtration, thus requiring no pasteurization. Analysis shows 0.26 gm. protein is present in 100 cc. of the finished beer. This is approximately the same as a popular beer now on the market.

Previous brewing attempts have been made to accomplish the desirable features which I set forth but all have failed to accomplish the primary object of quickly and economically separating the extract obtained from large amounts of raw cereal grain and small amounts of malt. Contrary to the old procedure it is not necessary to produce dextrin which in the past was thought necessary to lend so-called palate fullness and foam holding properties to the finished product. These properties can be better fulfilled by producing desirable non-coagulable permanently soluble products such as albumoses, peptones, etc., all lending to the finished product a more desirable, pronounced grain and hop bouquet and a stable, chill proof fermented cereal beverage.

Heretofore the brewing industry has been severely handicapped, through lack of conversion and filtration knowledge, in producing a cereal beverage at the lowest possible cost, while retaining all the desirable characteristics of the old beverage. The features that differentiate my process from the old is that I make no attempt to product slow filtering mixtures which require sparging with subsequent loss of extract in the residue grains. I add a sterile solution of enzymes to raw and cooked grains for the purpose of modifying into simpler compounds such complex groups as proteins, carbohydrates, and fibers through the use of temperature control in successive pressure cooking and conversion steps to effect mobile fluid mixtures which are easily filterable to provide an enzymically active wort and a comparatively dry residue cereal cake (60% moisture.) Furthermore, the aseptically fermented, enzymically active, cereal beverage produced under my procedure is characterized by having only traces of carbohydrates in the finished product as compared to the old conventional non-enzymically active product, having large amounts of residual carbohydrates of substantially higher caloric value, and consequent undesirable fattening effect.

In the past breweries fermented and stored their products in containers that had a greater ratio of surface compared to the volume of liquid, and it is the tendency today for breweries to ferment and store their products in large volumes which greatly reduces the container area in contact with the liquid thus reducing the surface adsorption necessary for clarification. A few breweries, in order to increase the adsorption area relied upon beech wood, chips, and other related products to promote clarification but as these products were a source of danger, due to biological contamination, this has been gradually abandoned. As the beer clarified very slowly and improperly, breweries in general had to rely upon elaborate and costly filtration which detracted from the quality of the finished product.

In my process the mixtures are effectively separated to produce a clear wort before fermentation and by a novel cooking and conversion operation provides a liquid which clarified quickly and completely and does not require the elaborate and costly filtration necessary in the old procedure.

In the art of brewing, as it has been practiced in the past, two general methods of impregnating the beer with carbon dioxide gas have been followed. The first, termed "natural charging" consisted of impregnating the gas into the beer with self generated gas after main fermentation by adding a portion of freshly fermenting beer in a closed container. The second, termed "artificial charging" consisted of mixing the carbon dioxide gas into the beer by mechanical means effected by "carbonators." The purpose of carbonating beer is to improve its appearance and palatability and there is a difference which can be fully recognized by connoisseurs between beer which has been naturally impregnated and those which have been artificially impregnated with carbon dioxide gas. The difference is in the superior foam-holding qualities and the greater intimacy of association of the gas obtained by natural impregnation. The objectionable features of the "natural charging" was that this process was expensive not only due to the time, and room required, but also to elaborate and expensive refrigeration. Moreover, an important defect in this process was the fact that fermenting may not completely subside at the desired time but continue to act after the product was packaged for consumption. One of the features of my invention relates to treatment of the fermenting product to effect the most efficient economical and desirable carbonation. This is accomplished by maintaining the product during fermentation under a pressure of 5–10 lbs. the excess carbon dioxide gas generated and vented into the atmosphere in one step eliminating the second steps used in the old procedure. Analysis shows .0518 gm. maltose per 10 cc. remains in the finished beer. This is equivalent to 0.25% alcohol by volume, indicating a practically theoretical yield of alcohol has been obtained. A popular beer now on the market shows an analysis of about twice as much maltose and six times as much dextrin.

This invention comprises a conversion of products into soluble form for rapid filtration and subsequent fermentation procedure which may be applied to malt syrup manufacture, brewing, and food products. The relationship of my invention to the present conventional process will be further disclosed in the following detailed procedure. I prefer to use specified periods of time, degrees of temperatures, use of sterile enzymic malt residue and solution, number of pressure cooks, kind and weights of materials specified although I appreciate that various modifications may be desirable under variable conditions.

PROCEDURE

All cereals ground—100% to pass through a 20 mesh screen.

*2,000 gallon capacity malt tank*

Ground high Lintner value malt_pounds__ 1,089
Water containing 1–800 parts 40% U. S. P.
 formaldehyde _____gallons__ 1,200

Malt flour free of husks mixed in water containing 1–800 parts formaldehyde is agitated 30 minutes and settled 30 minutes, after which the liquid diastase is decanted and reserved.

*8,000 gallon capacity pressure cooker equipped with agitator*

Water _____gallons__ 2,300
Ground corn grits _____pounds__ 4,357
Finely shredded hops_____do____ 225

This will produce approximately 97 barrels of enzymically active wort (31 gallons to barrel) with an apparent Balling of 13.8.

The finely ground corn grits previously separated, finely ground sterile malt residue previously prepared is added to the water and held at 122° F. for 60 minutes, the temperature gradually raised to 160° F. within 30 minutes and held 15 minutes and hops added; the temperature again raised to 180° F. within 15 minutes, held 15 minutes, immediately raised to 310° F. after which it is immediately cooled to 160° F. and 20% of the sterile enzyme solution added. The temperature is then raised to 180° F. within 15 minutes, held 15 minutes, immediately cooled to 122° F. at which point the balance of the 80% sterile enzyme solution is added and then held approximately 45 minutes for primary conversion, after which it is gradually heated to 160° F. and rapidly filtered.

Amounts of materials necessary to produce one barrel of beer (31 gallons)

| Pounds | Old procedure | Per cent extract | Pounds extract | New procedure | Pounds extract |
|---|---|---|---|---|---|
| Malt | 37.00 | 73.69 | 26.895 | 9.96 | 7.239 |
| Corn | 7.28 | 87.36 | 6.359 | 39.84 | 31.804 |
| Rice | 3.92 | 92.88 | 3.640 | | |
| Sugar and syrups | 3.22 | 95.60 | 3.078 | | |
| Hops | 0.63 | | | 0.63 | |

| | Old procedure pounds extract | New procedure pounds extract |
|---|---|---|
| Total pounds extract | 39.97 | 42.04 |
| Weight of water in a barrel of beer | 266.56 | 266.56 |
| Total weight of wort in barrel of beer | 306.53 | 308.60 |
| Balling of wort | 13.04 | 13.62 |

In the foregoing description I have proposed to disclose an improved method of processing cereals for rapid filtration, increased fermentation efficiency, and preservation of vitamins which in all improve the over all efficiency and economy to produce a uniform distinctive type fermented cereal beverage of which the following are specific benefits obtained through the use of my new process:

An increased yield of cereal extractives.
Quicker and more economical operations.
The use of low cost source of starch.
Elimination of expensive and elaborate mash tun, brew kettle, and hop jack.
Elimination of expensive and elaborate refrigeration equipment.
A more uniform quality product in regard to palatability and bouquet.
A distinctive and new type cereal beverage.
A chill proof beverage.
A biologically stable beverage which does not require pasteurizing in order to be kept over long periods of time without refrigeration.
Bacterial free fermentation process.
A non-fattening beverage.
An enzymically active beverage.

Having thus disclosed my invention, I claim:

1. The method of processing raw grain in the manufacture of fermented stable, chill-proof and enzymically active cereal beverages which consists of the following steps: Preparing a diastatically active sterile diastaste mixture by mixing fine ground high-Lintner malt with approximately nine times its weight of water and 40% U. S. P. formaldehyde in the proportion of 800 water to one formaldehyde; agitating and settling the diastaste mixture and decanting the sterile diastase solution; mixing four times as much fine ground corn as malt in approximately four and a half times its weight in water with the residue malt grains from the diastase mixture to liquefy the mixture; cooking the grain mixture by raising the temperature to 122° F. and holding, gradually raising the temperature to 160° F. and holding fifteen minutes, adding finely shredded hops in proportion of about 1 to 20 of grain, raising the temperature to 180° F. and holding about fifteen minutes, then raising the temperature to over 300° F. and cooling to about 122° F.; adding the decanted sterile diastase solution for primary conversion; heating to 160° F.; filtering the mixture in a rapid one-pass operation to produce a sterile wort and dry grain cake; and fermenting the wort under 5 to 10 lbs. per sq. in. pressure, thereby producing a stable, chill-proof, enzymically active cereal beverage.

2. The method of processing raw grains in the manufacture of fermented stable, chill-proof and enzymically active cereal beverage which consists of the following steps: Preparing a diastatically active sterile diastase mixture by mixing fine ground high-Lintner malt with water and 40% U. S. P. formaldehyde in the proportion of 800 water to one formaldehyde; agitating and settling the diastase mixture and decanting the sterile diastase solution; mixing four times as much fine ground corn as malt in water with the residue malt grains from the diastase mixture; cooking the grain mixture by raising the temperature to about 122° F., gradually raising the temperature to 160° F., adding finely shredded hops in proportion of about 1 to 20 of grain, raising the temperature to about 180° F., then raising the temperature to over 300° F. and cooling to about 122° F.; adding the decanted sterile diastase solution for primary conversion; heating to about 160° F.; filtering the mixture in a rapid one-pass operation to produce a sterile wort and dry grain cake; and fermenting the wort, thereby producing a stable, chill-proof enzymically active cereal beverage.

3. The method of processing raw grains in the manufacture of fermented stable, chill-proof and enzymically active cereal beverage which consists of the following steps: Preparing a diastatically active sterile diastase mixture by mixing fine ground high-Lintner malt with water and 40% U. S. P. formaldehyde; agitating and settling the diastase mixture and decanting the sterile diastase solution; mixing fine ground corn in water with the residue malt grains from the diastase mixture; cooking the grain mixture by raising the temperature to about 160° F., adding finely shredded hops, raising the temperature to about 180° F., then raising the temperature to over 300° F. and cooling to about 122° F.; adding the decanted sterile diastase solution for primary conversion; heating to about 160° F.; filtering the mixture in a rapid one-pass operation to produce a sterile wort and dry grain cake; and fermenting the wort, thereby producing a stable, chill-proof enzymically-active cereal beverage.

4. The method of processing raw grains in the manufacture of fermented stable, chill-proof and enzymically active cereal beverage which consists of the following steps: Mixing fine ground corn with water; adding a diastatically active sterile diastase solution to liquefy the mixture; cooking the mixture by raising the temperature, first to about 122° F., then raising to 160° F. and adding finely shredded hops, then raising temperature to 180° F., then over 300° F., then cooling to about 122° F.; adding sterile diastase solution for conversion, heating to about 160° F.; filtering the mixture in a rapid one-pass operation to produce a sterile wort; and fermenting the wort to produce a cereal beverage.

HARRY G. ATWOOD.